June 29, 1937. G. K. GEERLINGS Re. 20,427

CONTAINER

Original Filed Jan. 18, 1933

INVENTOR.
GERALD K. GEERLINGS.

BY

Albert Sperry.
ATTORNEY.

Reissued June 29, 1937 Re. 20,427

UNITED STATES PATENT OFFICE 20,427

CONTAINER

Gerald K. Geerlings, New Canaan, Conn.

Original No. 2,035,877, dated March 31, 1936, Serial No. 652,314, January 18, 1933. Application for reissue February 25, 1937, Serial No. 127,802

9 Claims. (Cl. 215—31)

My invention relates to containers such as bottles and the like, and particularly to containers designed for holding pharmaceutical or chemical preparations in liquid form.

It is well known that in pouring a liquid from a bottle a drop of the liquid always adheres to the neck when the bottle is tilted back to its vertical position, and, since the drop hangs from the outer edge of the neck, when the bottle is righted the drop usually runs down the outside of the bottle. Furthermore, when the bottle is placed upright, the liquid remaining on the edge of the neck usually spreads over the top of the neck of the bottle, forming a film of liquid thereon. This characteristic of bottles or containers is extremely objectionable when the liquid is of a corrosive or sticky nature or tends to harden or deposit crystals on standing. Such bottles are dangerous to handle if the liquid is corrosive and present an extremely unsightly appearance when streaked with colored or sticky liquid. When caps are applied to receptacles of this type the film of liquid on the top of the neck tends to corrode or rust the cap and threads, contaminating the liquid and rendering it extremely difficult to remove the cap after the bottle has stood for some time.

Containers for paint, varnish, lacquers and so forth, which tend to harden on drying, are also subject to this objection, and for this reason paint cans are not ordinarily provided with threaded necks, although threaded closures provide considerable advantages over closure of other types for use on containers having liquids therein which tend to evaporate.

Attempts have been made to overcome the disadvantages inherent in bottles formed with rounded upper edges at the top of the neck by forming an outwardly turned tapering lip which is considered to reduce the amount of liquid adhering to the edge of the bottle. However, even with such construction the outlet opening in the neck of the bottle is circular so that the liquid in passing over the edge of the neck flows over a relatively large portion of the circumference thereof, wetting the same and causing the liquid to flow laterally over the top of the neck when the bottle is righted so that corrosion and sticking of the cap is not materially reduced.

Furthermore, it is common practice to provide containers with internally threaded necks formed with an externally located pouring spout, the container being closed by an externally threaded plug or closure fitting within the neck so that the pouring spout is always exposed. However, this construction is not adapted for use on bottles or glassware wherein the pouring spout is liable to be injured during shipment or handling of the bottle.

In accordance with my invention, the foregoing objections and difficulties presented by the use of bottles and containers of the prior art are overcome and a container provided which is formed with an externally threaded neck adapted to receive and engage an internally threaded cap formed with complementary threads, the neck being provided with a pouring spout designed to be covered by the closure member and formed to confine the liquid being discharged from the container to a limited area of the neck of the container. The provision of a pouring spout serves to prevent the flow of liquid down the outside of the bottle or laterally about the top of the neck when the bottle is righted.

In the present invention the container is provided with a threaded neck having a pouring spout formed thereon. However, in the present instance the neck is threaded substantially to the top thereof and the pouring spout may be located in whole, or in part, within the threaded portion of the neck.

One of the objects of my invention is to prevent the flow of liquid down the exterior of the neck or laterally over the top of the neck of a container.

Another object of my invention is to prevent the corrosion and sticking of threaded caps to the necks of containers.

A further object is to provide a container having an externally threaded neck formed with a pouring spout thereon.

Another object is to provide a container having a pouring spout adapted to be covered by the closure for the receptacle.

A further object of my invention is to provide a bottle adapted to contain pharmaceutical or chemical preparations in liquid form which is free from the difficulties and disadvantages inherent in bottles formed with circular outlet openings.

Another object of my invention is to provide a container having a neck threaded substantially to the top thereof and having a pouring spout formed in the neck.

These and other objects and features of my invention will appear from the following description of preferred forms thereof, in which Fig. 1 is a plan view of a preferred structure as applied to a bottle;

Figure 5:
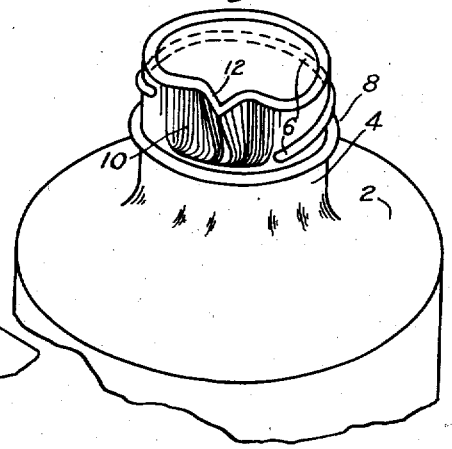
Figure 4:
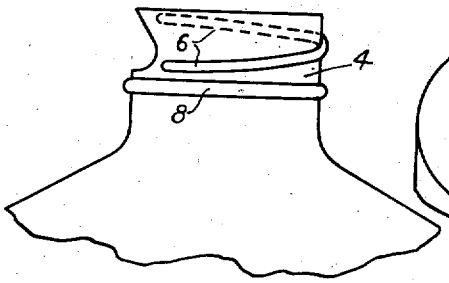

Figs. 4 and 5 respectively, show a side and a perspective of an alternative form of structure embodying my invention.

Figure 1:
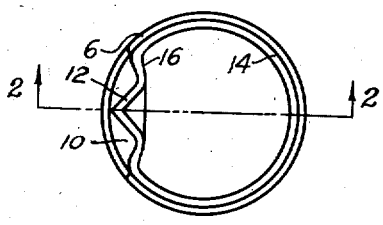
Figure 3:
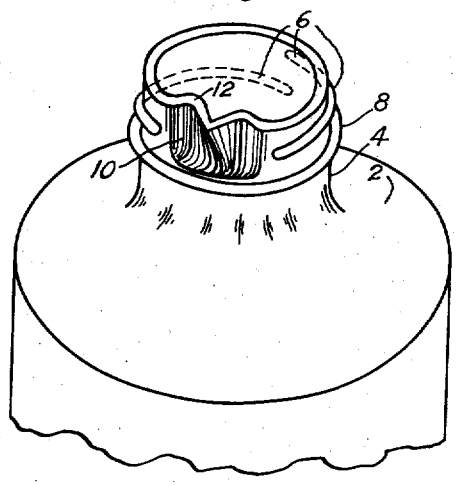
Fig. 3 is a perspective of a bottle having the neck thereof formed as shown in Figs. 1 and 2, with the cap removed.
Figure 2:
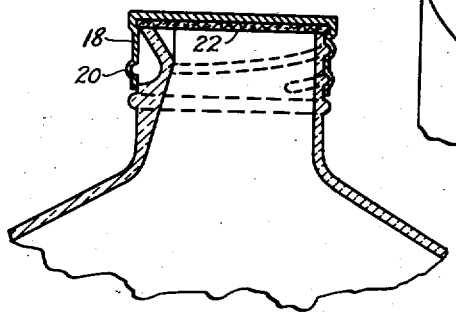
Fig. 2 is a vertical sectional view of a bottle with a cap thereon taken on the line 2—2 of Fig. 1.

In the form of the invention illustrated in Figs. 1, 2, and 3, of the drawing the container is in the form of a bottle 2 having a neck 4 provided with a thread 6. A shoulder 8 may be formed on the neck of the bottle below the thread 6 to limit the downward movement of the cap if desired. The thread 6 at the point 10 is interrupted for a sufficient distance to permit the formation of a pouring spout 12. The pouring spout is formed by a contraction of the material from which the neck is formed at the points 16 on either side of the spout 12 and within the space 10 in the interrupted portion of the thread 6. The interior of the neck of the container is substantially cylindrical throughout the portion 14 thereof and is formed with depressed portions 16 on either side of the pouring spout 12. The pouring spout thus constitutes an angularly formed lateral projection on the neck of the container which serves to confine the liquid as it is poured therefrom. I prefer to construct the pouring spout with inwardly and sloping lower sides so as to cause liquid to drain back into the bottle from the pouring spout when the bottle is righted after pouring liquid therefrom.

The top of the neck of the container is preferably flat, so that the entire top of the neck lies within a single plane. The neck thus provides a flat surface against which a packing member may bear to seal the container against leakage during handling and shipping thereof.

A cap 18 formed with a continuous thread 20 is adapted to engage the thread 6 on the neck of the container. Packing member 22 is carried by the cap in the top thereof so that upon screwing the cap down on to the neck of the container the packing member will engage the top of the neck to seal the container against leakage.

By this arrangement, the container is formed with a pouring spout within the threaded portion of the neck thereof and at the same time the usual threaded cap employed for closing such containers may be used. The outer extremity of the pouring spout 12 is located in alignment with, or within the inner diameter of the thread 6, as determined by the vertical portion of the neck of the bottle. For this reason the pouring spout does not interfere in any way with the application or, the removal of the cap from the container. When the cap is applied the pouring spout is wholly covered by the cap so that injury thereto in handling the container is avoided.

In the alternative form of the invention, illustrated in Figs. 4 and 5, the thread 6 is formed so that it begins at one side of the pouring side 12 and terminates at the opposite side thereof. The pouring spout is thus located between the ends of the thread and does not interfere in any way with the application of a cap thereto. In this form of the invention the outer extremity of the pouring spout 12 may be positioned so that it extends into the thread on the cap forming in effect a portion of the thread 6. This construction has the added advantage that the pouring spout 12 may extend beyond the vertical portion of the neck 4 and into alignment with the outer diameter of the thread 6. For this reason the pouring spout 12 may be formed somewhat larger than in the construction illustrated in Figs. 1, 2, and 3, without interfering with the application of the cap to the neck of the bottle.

In the drawing I have illustrated bottles in which the edge of the top of the neck is flat. However, the edge may of course be rounded or bevelled if desired, but in any case I prefer that the top of the neck should be entirely in a single plane so as to provide a suitable surface against which the packing member may engage to seal the container against leakage.

While I have illustrated and described two alternative forms of my invention, it will be apparent that the invention is not limited to these particular structures or to the use thereof on bottles or glass receptacles, but may be applied to other containers whether formed of metal, resinous compositions or other material. It should therefore be understood that I do not wish to confine my invention to the preferred forms thereof herein illustrated and described except as defined by the claims.

I claim:

1. In a container having a neck of generally cylindrical form with a cap retaining means on its outer surface and with an opening therethrough generally concentric with said outer surface, which opening is substantially cylindrical in form throughout the greater portion of the surface thereof, the remaining portion of said opening surface projecting within a cylinder formed as a continuation of the cylindrical portion of said opening surface, a pouring spout formed therein, said spout projecting outwardly from adjacent portions of said inwardly projecting opening surface and lying partly within the cylinder formed as a continuation of the cylindrical portion of said opening surface and entirely within the cap-retaining means.

2. The combination comprising a container having a neck of generally cylindrical form the top of which lies entirely in a single plane and the outer surface of which is formed with cap retaining means thereon, said neck having an opening therethrough generally concentric with said outer surface, which opening is substantially cylindical in form throughout the greater portion of the surface thereof, the remaining portion of said opening surface projecting within a cylinder formed as a continuation of the cylindrical portion of said opening surface, a pouring spout formed therein, said spout projecting outwardly from adjacent portions of said inwardly projecting opening surface and lying partly within the cylinder formed as a continuation of the cylindrical portion of said opening surface and entirely within the cap-retaining means, and a closure for said container engaging said cap-retaining means and having a sealing member carried thereby and engaging the top of said neck.

3. The combination comprising a container having a neck of generally cylindrical form with a cap retaining means on its outer surface and with an opening therethrough generally concentric with said outer surface, which opening is substantially cylindrical in form throughout the greater portion of the surface thereof, the remaining portion of said opening surface projecting within a cylinder formed as a continuation of the cylindrical portion of said opening surface, a pouring spout formed therein, said spout projecting outwardly from adjacent portions of said inwardly projecting opening surface and lying partly within the cylinder formed as a continuation of the cylindrical portion of said opening surface and entirely within the cap-retaining means and a closure engaging the cap-retaining means on the neck of the container and cooperating with said neck below the pouring spout to completely enclose the same.

4. In a container having a neck of generally cylindrical form with a thread on the outer surface thereof extending substantially to the top of said neck and with an opening therethrough generally concentric with said outer surface, which opening is substantially cylindrical in form throughout the greater portion of the surface thereof, the remaining portion of said opening surface projecting within a cylinder formed as a continuation of the cylindrical portion of said opening surface, a pouring spout formed therein, said spout projecting outwardly from adjacent portions of said inwardly projecting opening surface and lying partly within the cylinder formed as a continuation of the cylindrical portion of said opening surface and entirely within the circumference of said thread, said thread being interrupted adjacent said pouring spout.

5. In a container having a neck of generally cylindrical form with a thread on its outer surface and with an opening therethrough generally concentric with said outer surface, which opening is substantially cylindrical in form throughout the greater portion of the surface thereof, the remaining portion of said opening surface projecting within a cylinder formed as a continuation of the cylindrical portion of said opening surface, a pouring spout formed therein, said spout projecting outwardly from adjacent portions of said inwardly projecting opening surface and lying partly within the cylinder formed as a continuation of the cylindrical portion of said opening surface and entirely within the circumference of said thread, said thread beginning at one side of said pouring spout and terminating on the opposite side thereof.

6. A ready pouring container for liquids having a cylindrical neck the top of which is flat and presents a sealing surface lying entirely in a plane at right angles to said cylindrical neck and having fastening means on the outer surface thereof describing a descending helical path about said neck, said neck having an inwardly deflected portion formed on one side only of the neck and above the level of the lower extremity of said fastening means, said neck also having a discharge passage therethrough the interior surface of which passage extends inwardly in that part of the neck in which said inwardly deflected portion is located to form a weir over which liquid may flow in being poured from said container, the interior surface of said passage above said weir and between said weir and the top of said neck presenting an outwardly inclined channel the sides of which confine liquid passing over said weir to form a stream of limited width, said inwardly deflected portion presenting a surface on the outside of said neck extending inwardly beneath the channel in the inner surface of said neck and cooperating therewith to form a pouring spout lying within a circle defined by the major part of said sealing surface.

7. A container having a neck with a passage therethrough for the discharge of the contents from the container, said neck presenting an outer surface of generally cylindrical form with downwardly extending helical securing means thereon for receiving a closure and having a top which is flat and presents a sealing surface lying entirely in a plane at right angles to said cylindrical neck, said discharge passage having a portion extending inwardly on one side of the passage below but closely adjacent to the top of the neck to form a weir over which liquid may flow in being discharged from said container, the upper surface of said weir being formed with a channel for confining the liquid passing over the weir to restrict the same to a stream of limited width, and said channel lying entirely within the circumference of a circle defined by the major portion of the sealing surface on the top of said neck.

8. A container having a neck with a passage therethrough for the discharge of the contents from the container, said neck presenting an outer surface of generally cylindrical form with downwardly extending helical securing means thereon for receiving a closure and having a top which is flat and presents a sealing surface lying entirely in a plane at right angles to said cylindrical neck, said neck having a portion extending inwardly from the outer cylindrical surface on one side of the neck and located above the lower extremity of said securing means, said inwardly extending portion forming a weir within the discharge passage and on one side thereof, the upper surface of said weir being formed with a channel for confining liquid passing over said weir to restrict the same to a stream of limited width, said channel lying within the circumference of a circle defined by the major portion of said sealing surface, the outer surface of said inwardly extending portion extending inwardly beneath said channel to cooperate therewith to discourage flow-back of liquid along the exterior of said neck.

9. In a container having a neck of generally cylindrical form with cap retaining means on its outer surface and with an opening therethrough which is substantially cylindrical in form throughout the greater portion of the surface thereof, the remaining portion of said opening surface projecting within a cylinder formed as a continuation of the cylindrical portion of said opening surface, a pouring spout formed therein and projecting outwardly from adjacent portions of said inwardly projecting opening surface and lying partly within the cylinder formed as a continuation of the cylindrical portion of said opening surface and entirely within the cap retaining means, the outer surface of said neck extending inwardly beneath said pouring spout and cooperating therewith to discourage flow-back of liquid along the exterior of said neck.

GERALD K. GEERLINGS.